(12) United States Patent
Yellin

(10) Patent No.: US 9,781,611 B2
(45) Date of Patent: *Oct. 3, 2017

(54) BOOSTED, DEDICATED REFERENCE SIGNAL

(71) Applicant: Marvell World Trade Ltd., St. Michael (BB)

(72) Inventor: Daniel Yellin, Ra'anana (IL)

(73) Assignee: Marvell World Trade LTD., St. Michael (BB)

( * ) Notice: Subject to any disclaimer, the term of this patent is extended or adjusted under 35 U.S.C. 154(b) by 151 days.

This patent is subject to a terminal disclaimer.

(21) Appl. No.: 13/850,856

(22) Filed: Mar. 26, 2013

(65) Prior Publication Data

US 2013/0244604 A1 Sep. 19, 2013

Related U.S. Application Data

(63) Continuation of application No. 12/410,931, filed on Mar. 25, 2009, now Pat. No. 8,412,271.

(Continued)

(51) Int. Cl.
*H04W 24/02* (2009.01)
*H04W 52/32* (2009.01)
(Continued)

(52) U.S. Cl.
CPC ......... *H04W 24/02* (2013.01); *H04W 52/325* (2013.01); *H04W 52/42* (2013.01); *H04L 25/0224* (2013.01)

(58) Field of Classification Search
CPC .............. H04W 52/325; H04W 52/346; H04L 25/0238; H04L 25/024–25/0258; H04L 27/008; H04L 27/0012; H04L 5/0051
See application file for complete search history.

(56) References Cited

U.S. PATENT DOCUMENTS 4,930,029 A 5/1990 Morita
4,965,684 A 10/1990 Stefansky
(Continued)

FOREIGN PATENT DOCUMENTS

WO WO-01/93456 A1 12/2001
WO WO 0193456 A1 * 12/2001

OTHER PUBLICATIONS

R1-0801108; 3GPP TSG-RAN 1 Meeting #52; Sorrento, Italy; Feb. 11-15, 2008; Way Forward on Dedicated Reference Signal Design for LTE downlink with Normal CP; Motorola, Nortel, Broadcomm, Nokia, NSN, NTT DoCoMo, NEC, Mitsubishi, Alcatel-Lucent, CATT, Huawei, Sharp, Texas Instrument, ZTE, Panasonic, Philips, Toshiba; 2 pages.

(Continued)

*Primary Examiner* — Nalini Mummalaneni

(57) ABSTRACT

A device includes a receiver, a determiner, and a demodulator. The receiver is configured to receive from a base station a reference signal having a power level such that a sum of the power level and a processing gain of a channel estimator of the device corresponds to a predetermined demodulation penalty for the device. The determiner is configured to determine the power level. The demodulator is configured to demodulate a data signal received from the base station based on the power level and a channel estimate generated based on the reference signal.

18 Claims, 2 Drawing Sheets

Related U.S. Application Data

(60) Provisional application No. 61/040,486, filed on Mar. 28, 2008.

(51) Int. Cl.
*H04W 52/42* (2009.01)
*H04L 25/02* (2006.01)

(56) References Cited

U.S. PATENT DOCUMENTS

| | | | |
|---|---|---|---|
| 5,169,703 A | 12/1992 | Miyazaki et al. | |
| 5,245,486 A | 9/1993 | Hachiya et al. | |
| 5,790,343 A | 8/1998 | Takano et al. | |
| 5,844,747 A | 12/1998 | Wang | |
| 5,870,247 A | 2/1999 | Schirle | |
| 6,057,982 A | 5/2000 | Kloeppel | |
| 6,308,080 B1* | 10/2001 | Burt | H04W 52/08 455/127.2 |
| 6,320,723 B1 | 11/2001 | Bernett | |
| 6,411,516 B1 | 6/2002 | Palumbo et al. | |
| 6,449,462 B1* | 9/2002 | Gunnarsson et al. | 455/67.13 |
| 6,519,110 B2 | 2/2003 | Dague et al. | |
| 6,711,812 B1 | 3/2004 | Lu et al. | |
| 6,754,041 B2 | 6/2004 | Hong et al. | |
| 6,831,833 B2 | 12/2004 | Kim et al. | |
| 7,006,355 B2 | 2/2006 | Wakabayashi et al. | |
| 7,102,854 B2 | 9/2006 | Wang et al. | |
| 7,149,045 B1 | 12/2006 | Mallary et al. | |
| 7,274,533 B2 | 9/2007 | Kimura et al. | |
| 7,298,583 B2 | 11/2007 | Miyazaki et al. | |
| 7,365,938 B2 | 4/2008 | Yoo | |
| 7,383,557 B2 | 6/2008 | Toyoda et al. | |
| 7,461,933 B2 | 12/2008 | Deily et al. | |
| 7,486,475 B2 | 2/2009 | Biskeborn | |
| 7,502,200 B2 | 3/2009 | Aoki | |
| 7,589,962 B1 | 9/2009 | Bhatia | |
| 7,679,862 B2 | 3/2010 | Nakamoto et al. | |
| 7,751,156 B2 | 7/2010 | Mauri et al. | |
| 7,764,462 B1 | 7/2010 | Liu et al. | |
| 7,830,641 B2 | 11/2010 | Lin | |
| 7,869,218 B2 | 1/2011 | Ni et al. | |
| 7,944,703 B2 | 5/2011 | Ni et al. | |
| 7,957,094 B1 | 6/2011 | Liu et al. | |
| 8,077,816 B2* | 12/2011 | Wong | H03G 3/001 330/279 |
| 8,218,261 B1 | 7/2012 | Liu et al. | |
| 8,355,221 B1 | 1/2013 | Liu et al. | |
| 8,848,313 B1 | 9/2014 | Liu et al. | |
| 2001/0049210 A1 | 12/2001 | Pinteric et al. | |
| 2002/0007044 A1 | 1/2002 | Nakamura et al. | |
| 2002/0044540 A1* | 4/2002 | Mottier | H04W 52/325 370/335 |
| 2002/0070444 A1 | 6/2002 | Turner | |
| 2004/0184128 A1 | 9/2004 | Mikami | |
| 2005/0152118 A1 | 7/2005 | Cho | |
| 2005/0160702 A1 | 7/2005 | Perreault et al. | |
| 2006/0001159 A1 | 1/2006 | Garcia et al. | |
| 2006/0006480 A1 | 1/2006 | Shinozaki et al. | |
| 2006/0021903 A1 | 2/2006 | Perreault et al. | |
| 2006/0024531 A1 | 2/2006 | Murakami | |
| 2006/0109621 A1 | 5/2006 | Mojaver et al. | |
| 2006/0124585 A1 | 6/2006 | Suwa et al. | |
| 2006/0158049 A1 | 7/2006 | Suzuki et al. | |
| 2007/0121286 A1 | 5/2007 | Foster et al. | |
| 2007/0189240 A1 | 8/2007 | Cho et al. | |
| 2007/0217348 A1 | 9/2007 | Tapia Moreno et al. | |
| 2007/0230068 A1 | 10/2007 | Gill | |
| 2008/0080101 A1 | 4/2008 | Mauri et al. | |
| 2008/0204945 A1 | 8/2008 | Freitag et al. | |
| 2008/0212700 A1* | 9/2008 | Han et al. | 375/260 |
| 2008/0259507 A1 | 10/2008 | Lin | |
| 2009/0168267 A1 | 7/2009 | Lin | |
| 2009/0168269 A1 | 7/2009 | Carey et al. | |
| 2009/0323228 A1 | 12/2009 | Carey et al. | |
| 2010/0302681 A1 | 12/2010 | Mino et al. | |

OTHER PUBLICATIONS

OFDM and MC-CDMA for Broadband Multi-User Communications, WLANs and Broadcasting; L. Hanzo, M. Munster, B.J. Choi and T. Keller; All of University of Southhampton, UK; 2003; 65 pages.

Banister et al., "Feedback Assisted Stochastic Gradient Adaptation of Mulitantenna Transmission." IEEE Transactions on Wireless Commmuications vol. 4, No. 3 (May 1, 2005): pp. 1121-1135. Abstract: p. 1122, paragraph II.A—p. 1124, paragraph II.A.

Notification of Transmittal of The International Search Report and The Written Opinion of The International Searching Authority, or The Declaration dated Sep. 16, 2009 in reference to PCT/IB2009/005099 (15 pgs).

Tetsushi Abe and Gerhard Bauch; Differential Codebook MIMO Precoding Technique; IEEE Globecom 2007 proceedings.

U.S. Appl. No. 13/742,062, filed Jan. 15, 2013.

* cited by examiner

BOOSTED, DEDICATED REFERENCE SIGNAL

CROSS-REFERENCE TO RELATED APPLICATIONS

This is a continuation of U.S. patent application Ser. No. 12/410,931, filed on Mar. 25, 2009, which claims benefit from U.S. Provisional Patent Application No. 61/040,486, filed on Mar. 28, 2008. The entire disclosures of the above referenced applications are incorporated herein by reference.

FIELD OF THE INVENTION

The present invention generally relates to wireless communication, and in particular to channel estimation in cellular networks.

BACKGROUND

In cellular communications systems, a multiplicity of base stations may be distributed throughout a geographical area. Each base station communicates with user equipment (UE) devices, such as cellular phones, for example, which may move throughout the geographical area.

In order for the UE to perform coherent demodulation of the signals that it receives from a base station with which it is currently communicating, the UE needs to perform channel estimation. In order to facilitate channel estimation at the UE side, the base station may periodically broadcast, at known times and/or at known frequencies, "pilot" signals which are known to the UE and may be utilized to acquire the necessary channel information. Pilot signals may also be referred to as "reference signals" (RS), and these terms are used interchangeably throughout the following disclosure.

SUMMARY

There is provided, in accordance with an embodiment of the present disclosure, a base station forming part of a cellular communications system. The base station includes a reference signal generator, a boost selector and a transmitter. The reference signal generator provides a dedicated reference signal to be transmitted over plural antennas to a dedicated user device in a cellular reception area. The boost selector selects a dedicated boost level that is specific for the dedicated reference signal and the transmitter transmits the dedicated reference signal boosted by its dedicated boost level to the user device. In accordance with an embodiment of the disclosure, a first dedicated boost level applied to a first dedicated reference signal transmitted to a first dedicated user may be different than a second dedicated boost level applied to a second dedicated reference signal that is transmitted to a second dedicated user.

Moreover, in accordance with an embodiment, the boost selector includes a boost level setter to set the boost level to generate a predetermined demodulation penalty when a transmitted signal is demodulated by the dedicated user device.

Further, in accordance with an embodiment, the demodulation penalty is a function of a channel estimation processing gain plus the boost level.

Alternatively, in accordance with an embodiment, the boost selector includes a boost level setter to predefine a set of boost levels associated with modulation and coding scheme values and to select a boost level based on a currently selected modulation and coding scheme.

Further alternatively, in accordance with an embodiment, the boost selector includes a boost level setter to predefine a set of boost levels and to select an appropriate boost level.

Moreover, in accordance with an embodiment, the boost level is a downboost level.

Additionally, in accordance with an embodiment, the cellular communications system is an LTE communications system. The boost level changes the power level of the dedicated reference signal with respect to a transmitted data signal.

There is provided, in accordance with an embodiment of the present disclosure, a method for a base station. The method includes providing a dedicated reference signal to be transmitted over plural antennas to a dedicated user device in a cellular reception area, selecting a dedicated boost level that is specific for the dedicated reference signal and transmitting the dedicated reference signal boosted by its dedicated boost level to the user device.

There is also provided, in accordance with an embodiment of the present disclosure, method for a user equipment device of a cellular communications system. The method includes receiving a dedicated reference signal transmitted by a base station where the dedicated reference signal has been boosted by a dedicated boost level specific to the user device, determining the dedicated boost level and demodulating a data signal from the base station using the dedicated boost level and a channel estimation value.

Further, in accordance with an embodiment, the determining includes estimating a channel estimate from the reference signal and inferring the boost level from a predefined demodulation penalty which is a function of a gain produced by the channel estimate plus the boost level.

Alternatively, in accordance with an embodiment, the determining includes receiving a modulation and coding scheme value and setting the boost level to a boost level associated with the received modulation and coding scheme value.

Further alternatively, in accordance with an embodiment, the determining includes estimating the boost level as a function of a measured power ratio between received data signals and reference signals and selecting the boost level to be a boost level, from among a set of predefined boost levels, whose value is closest to the magnitude of the measured power ratio.

Still further, in accordance with an embodiment, the determining includes providing each of a set of predefined boost levels to a data demodulator and selecting the boost level which minimizes demodulation errors of the data demodulator.

There is also provided, in accordance with an embodiment of the present disclosure, a user equipment device forming part of a cellular communications system. The device includes a receiver, a boost determiner and a data demodulator. The receiver receives a dedicated reference signal transmitted by a base station where the dedicated reference signal has been boosted by a dedicated boost level specific to the user device. The boost determiner determines the dedicated boost level and the data demodulator demodulates a data signal from the base station using the dedicated boost level and a channel estimation value.

Moreover, in accordance with an embodiment, the determiner includes an estimator to estimate a channel estimate from the reference signal and an analyzer to infer the boost level from a predefined demodulation penalty which is a function of a gain produced by the channel estimate plus the boost level.

Further, in accordance with an embodiment, the determiner includes a receiver to receive a modulation and coding scheme value and a boost level setter to set the boost level to a boost level associated with the received modulation and coding scheme value.

Alternatively, in accordance with an embodiment, the determiner includes an estimator to estimate the boost level as a function of a measured power ratio between received data signals and reference signals and a boost selector to select the boost level to be a boost level, from among a set of predefined boost levels, whose value is closest to the magnitude of the measured power ratio.

Further alternatively, in accordance with an embodiment, the determiner includes a unit to provide each of a set of predefined boost levels to the data demodulator and a selector to select the boost level which minimizes demodulation errors of the data demodulator.

Still further, in accordance with an embodiment, the boost level is a downboost level.

Finally, in accordance with an embodiment, the cellular communications system is an LTE communications system and the boost level changes the power level of the dedicated reference signal with respect to a transmitted data signal.

BRIEF DESCRIPTION OF THE DRAWINGS

The subject matter regarded as the invention is particularly pointed out and distinctly claimed in the concluding portion of this specification. The subject matter of various embodiments, may best be understood with reference to the following figures, in which:

Figure 1:
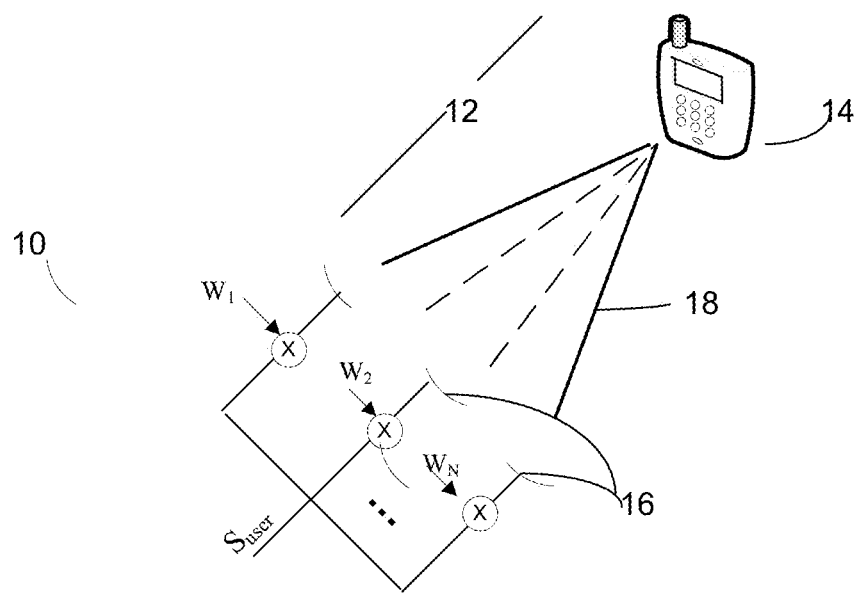
FIG. 1 is a schematic illustration of a base station configured to steer a transmitted beam towards a UE.

It is noted that for simplicity and clarity of illustration, elements shown in the figures have not necessarily been drawn to scale. For example, the dimensions of some of the elements may be exaggerated relative to other elements. Further, where considered appropriate, similar reference numerals that are repeated among the figures indicate corresponding or analogous elements.

DETAILED DESCRIPTION

The 3rd Generation Partnership Project (3GPP) is presently defining various communication protocols for the emerging next generation, LTE (Long Term Evolution) Advanced cellular telecommunication standard, which employs an air interface formally referred to as Evolved-UMTS Terrestrial Radio Access (E-UTRA).

Reference is now made to FIG. 1, which illustrates a base station 10 transmitting signals along a user channel 12 to a user equipment device (UE) 14. In accordance with emerging LTE standards, the base station 10 may employ "beamforming" techniques to steer a transmitted signal along user channel 12 so that it may be best received by the intended UE (14). With beamforming, a user signal $S_{user}$ is transmitted through a multiplicity of antennas 16 (three antennas are shown in this example, although a different number of antennas may be used), where each copy of the signal is multiplied by a different complex valued weight $w_i$ (i.e. a gain factor and a phase offset) for each antenna. The combination of the weights define a direction to the beam and/or a region of best reception.

The common reference signals of LTE, which are common to all UEs serviced by a base station, are generally inappropriate for channel estimation by a UE 14 receiving its data signal through beamforming, because the common reference signals are not transmitted through any beamforming weights while the UE's data signal is. Thus, for the purpose of coherent data demodulation for UEs in beamforming mode, these UEs have dedicated reference signals. The dedicated reference signal for each UE undergoes exactly the same beamforming weights (and consequently, the same channel conditions) as its UE's data signal, and are therefore used for the construction of the channel estimator for the beamforming mode.

Figure 2:
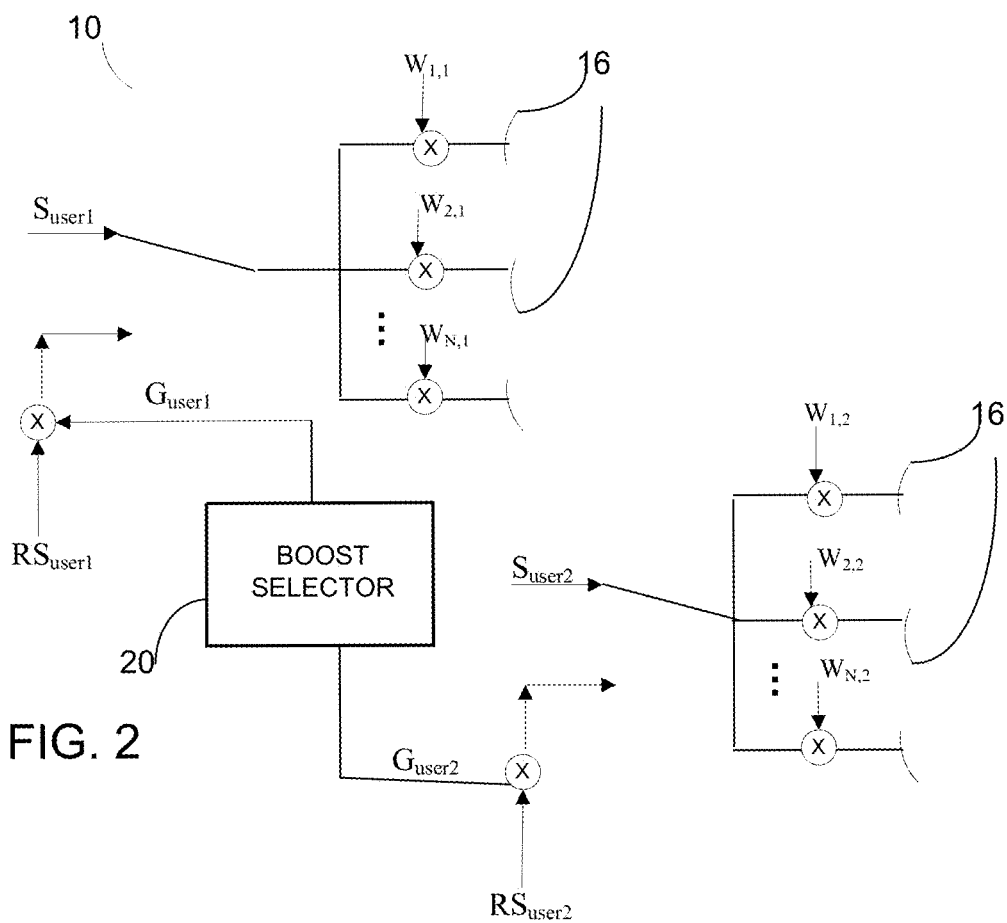
FIG. 2 is a schematic illustration of a base station configured to steer transmitted beams including data symbols and reference symbols toward different users in accordance with an embodiment of the invention.

In accordance with the emerging LTE-A standards, UEs operating in beamforming mode, such as UE 14, may also receive dedicated reference signals. FIG. 2, to which reference is now made, illustrates multiple reference signals RS transmitted through multiple antennas 16, for two exemplary users, $user_1$ and $user_2$. Different weights may be used for different UEs; thus, FIG. 2 shows a reference signal $RS_{user1}$ and a data signal $S_{user1}$ undergoing one set of weights optimized for $user_1$, and a reference signal $RS_{user2}$ and data signal $S_{user2}$ undergoing another set of weights optimized for $user_2$. Both the data signals S and the reference signals RS are transmitted through the same beamforming antennas 16; however, since $user_1$ and $user_2$ are in different locations, the weights multiplying the input signals (either the data signal S or the reference signal RS) may be different. Accordingly, FIG. 2 shows the two separately. In some cases, $user_1$ and $user_2$ may be served by different portions of the time-frequency domain, and in other cases (often known as multi-user MIMO) they may share, or partially share, the time-frequency resources.

When the user devices UEs 14 may be in particularly noisy locations and thus, channel 12 of FIG. 1 may have a high level of noise, UEs 14 may only be able to generate a poor quality channel estimation from its dedicated reference signals. This will degrade the quality of the data demodulation. In such a case, it may be desirable to "boost" (i.e. increase) the power of the reference signals. This may increase the signal to noise ratio of the reference signals, thereby enabling UEs 14 to calculate a more accurate channel estimate and ultimately resulting in an improved data demodulation. In another embodiment, it may make sense to reduce the power (i.e. "downboosting") to the dedicated reference signals, e.g. for the purpose of reducing the interference to other UEs in the cellular network. It is noted that, in the LTE draft specification R1-081108: "Way Forward on Dedicated Reference Signal Design for LTE downlink with Normal CP", Sorrento, February 2008, neither boosting nor downboosting reference signals is contemplated.

In general, the boosting/downboosting may change the power level of the transmitted signal. The boost typically may be with respect to the power level in the data signal to be demodulated. Alternatively, it may be with respect to some other suitable, predefined power level. This power level may be a fixed power level, fixed by the system, or it may be a changeable power level, changed for a dedicated user device. In which case, the boost level may be the extra power over the changed power level.

In accordance with an embodiment, base station 10 may comprise a boost selector 20 which may select boost/ downboost values G for each user. Base station 10 may multiply the relevant reference signal RS by the relevant boost value G ($G_{user1}$ for $RS_{user1}$ or $G_{user2}$ for $RS_{user2}$) and may transmit the resultant signal through the antennas 16, after multiplication by the appropriate beamforming weights w.

The UE typically needs to know the strength of the RS boost, in order to correctly scale the channel estimator to match the data signal (since the RS boost may add a scale factor to the output of the estimator). In accordance with an embodiment of the disclosure, base station 10 may signal the magnitude of the dedicated RS boost relative to the data to the UE. In another embodiment, the UE may blindly detect the RS-to-data boost.

Figure 3:
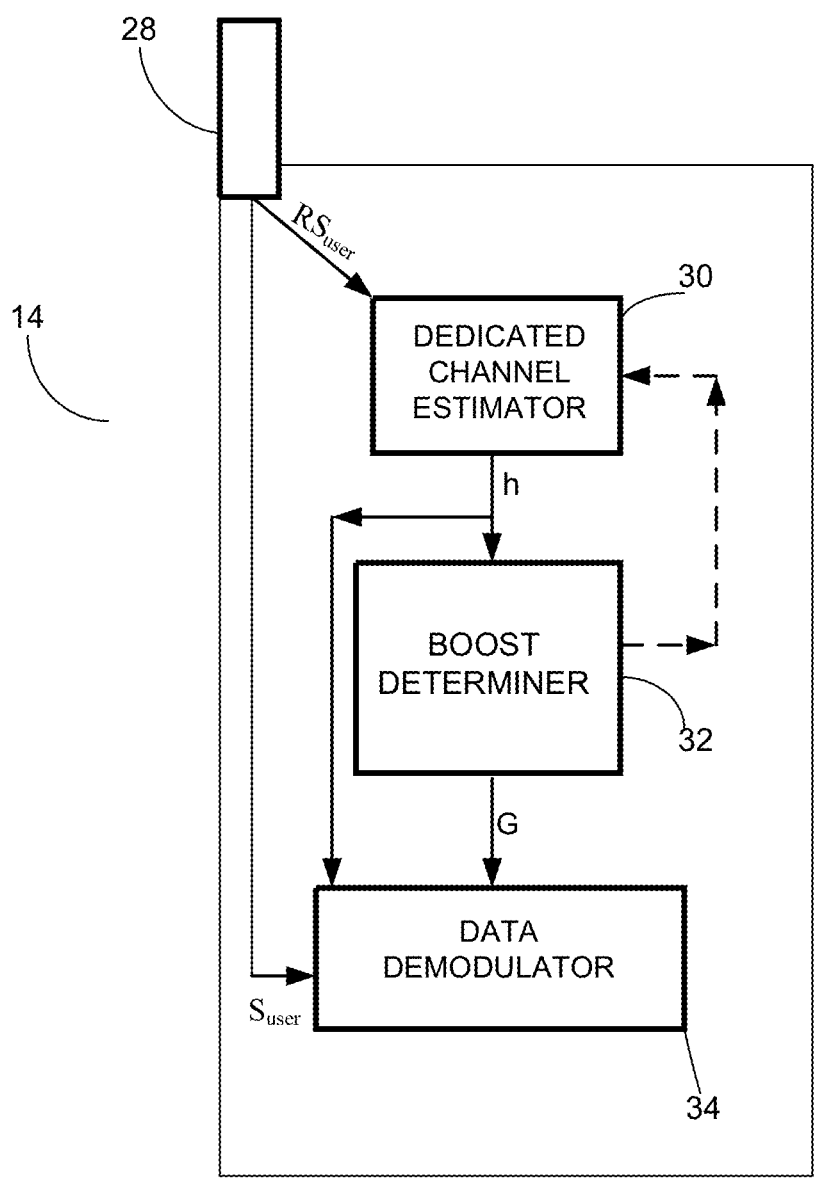
FIG. 3 is a schematic illustration of elements of a user equipment device, constructed and operative in accordance with a preferred embodiment, for demodulating the signals from the base station of FIG. 2.

Reference is now made to FIG. 3, which illustrates a user equipment device 14, constructed and operative in accordance with an embodiment of the disclosure, which demodulates data in a beamforming mode with boosted reference signals.

User equipment device 14 may comprise a receiver 28, a dedicated channel estimator 30, a boost determiner 32 and a data demodulator 34. Receiver 28 may be an antenna or any other device capable of receiving reference signal $RS_{user}$ and data signal $S_{user}$. Dedicated channel estimator 30 may be any suitable channel estimator, such as a Weiner estimator described in Chapter 14 of the book OFDM and MC-CDMA for Broadband Multi-User Communications, WLANs and Broadcasting by L. Hanzo et al, John Wiley & Sons, 2003. Dedicated channel estimator 30 may receive the dedicated reference signal $RS_{user}$ and may generate an initial channel estimate h therefrom.

Boost determiner 32 may determine the boost value. As described hereinbelow, base station 10 may signal the UE with the boost value, in which case, boost determiner 32 of UE 14 may process the signaling to determine the boost value. In another embodiment, described hereinbelow, boost determiner 32 may blindly estimate the ratio between pilot-to-data power and may determine the boost from this estimate. Finally, data demodulator 34 may utilize channel estimate h (produced by channel estimator 30) and boost level G (from boost determiner 32) to demodulate any incoming data signals $S_{user}$.

In base station 10, boost selector 20 (FIG. 2) may select the dedicated boost value $G_{user}$ in any suitable way in order to optimize the overall network performance.

In one embodiment, boost selector 20 may set the power for the dedicated reference signal (known as the "DPICH" in the LTE standard) so that some agreed upon, fixed, a-priori data demodulation penalty may be encountered, given an agreed upon channel estimator, such as estimator 30. For example, if the reference boost level is set such that the post processing channel estimation errors are 10 dB lower than the combination of noise and interference at the output of data demodulator 34, an overall data demodulation penalty of about 0.5 dB will be observed. In general, for this embodiment, boost selector 20 may set the boost level such that the sum of a channel estimation processing gain plus the power boost may yield the desired a-priori known demodulation penalty. Boost determiner 32 (in UE 14) may infer the boost level from the known penalty. For example, dedicated channel estimator 30 typically may determine post processing channel estimation errors resulting from noise samples from a plurality of dedicated reference pilots, averaged together. If these errors are different than the expected error level of 10 dB lower than the combination of noise and interference at the output of data demodulator 34, then the boost level is the cause. For example, if the post processing errors are only 3 dB lower and the expected post processing errors are targeted at 10 dB below the total noise plus interference level, then the reference signal boost is 7 dB. Or, if the post processing errors are 13 dB lower, then the downboost is −3 dB.

Another embodiment may utilize the fact that, in the LTE standard, the modulation and coding scheme (MCS) is determined based on SNR reports (called CQI). Since the extent of the boost may also be dependent on the SNR levels and/or the MCS, in this embodiment, boost selector 20 may have a set of predefined reference boost levels, one for each MCS, and may select the boost level based on the currently selected MCS. These boost levels, as a function of MCS, may be determined from downlink performance simulations with the DPICH reference signals.

Because the MCS is signaled to UEs 14, boost determiner 32 may determine the boost level as the boost level associated with the current MCS value.

In another embodiment, boost selector 20 may have a predefined set of boost levels, e.g.: 0, 3 and 6 dB, from which to select. Boost determiner 32 may then estimate the boost level from the measured power ratio between received data signals and reference signals, selecting the boost level to be the predefined boost level whose value is closest to the measured power ratio.

Alternatively, boost determiner 32 may alternately provide each of the boost levels to data demodulator 34 and may select the boost level which minimizes demodulation errors.

Unless specifically stated otherwise, as apparent from the disclosure herein, any "processing," "computing," "calculating," "determining," or similar operations, refer to operations that may be performed in dedicated computing hardware, or in a generalized computer device using firmware or software.

While certain features of embodiments of the invention have been illustrated and described herein by way of example, many modifications, substitutions, variations, changes, combinations and equivalents may be apparent to those of ordinary skill in the art. Accordingly, the scope of the present invention as embodied in the claims appended hereto is intended to cover all such modifications, substitutions, variations, changes, combinations and equivalents occurring to a person of ordinary skill based on the foregoing description and which are not disclosed in the prior art.

What is claimed is:

1. A device comprising:
a receiver configured to receive, from a base station, a reference signal having a first power level and a data signal having a second power level;
a boost determiner configured to determine a power ratio between the first power level and the second power level that minimizes demodulation errors, wherein the boost determiner determines the power ratio from a predetermined demodulation penalty for a data demodulator, wherein the predetermined demodulation penalty is a function of a sum of the power ratio and a channel estimation processing gain of a channel estimator;
the channel estimator configured to generate a channel estimate based on the reference signal and the power ratio; and
the data demodulator configured to demodulate the data signal received from the base station, the data signal being demodulated based on
i) the power ratio, and
ii) the channel estimate;

wherein the channel estimation processing gain is a processing gain of the channel estimator with which the reference signal is processed to generate the channel estimate; and wherein the predetermined demodulation penalty is an expected demodulation error level when the reference signal having the first power level is processed by the channel estimator having the channel estimation processing gain.

2. The device of claim 1, wherein the receiver is configured to receive the reference signal having the first power level that is specific to the device.

3. The device of claim 1, wherein the boost determiner is configured to determine the first power level based on a signal indicating a magnitude of the first power level received from the base station.

4. The device of claim 1, wherein the boost determiner is configured to infer the first power level based on the predetermined demodulation penalty.

5. The device of claim 1, wherein the boost determiner includes a level setter configured to set the first power level based on a modulation and coding scheme.

6. The device of claim 1, wherein the boost determiner comprises:
   a unit configured to provide a set of predefined power levels to the data demodulator; and
   a selector configured to select one of the predefined power levels that minimizes the demodulation errors.

7. The device of claim 1, wherein the first power level includes a downboost level.

8. A method comprising:
   receiving, from a base station, a reference signal having a first power level and a data signal having a second power level;
   determining a power ratio between the first power level and the second power level that minimizes demodulation errors, from a predetermined demodulation penalty for a data demodulator, wherein the predetermined demodulation penalty is a function of a sum of the power ratio and a channel estimation processing gain of a channel estimator;
   generating a channel estimate with the channel estimator based on the reference signal and the power ratio; and
   demodulating the data signal received from the base station with the data demodulator, the data signal being demodulated based on
   i) the power ratio, and
   ii) the channel estimate;
   wherein the channel estimation processing gain is a processing gain of the channel estimator with which the reference signal is processed to generate the channel estimate; and
   wherein the predetermined demodulation penalty is an expected demodulation error level when the reference signal having the first power level is processed by the channel estimator having the channel estimation processing gain.

9. The method of claim 8, wherein the reference signal is received by a device from the base station and is specific to the device.

10. The method of claim 8, wherein determining the power ratio comprises determining the first power level based on a signal indicating a magnitude of the first power level received from the base station.

11. The method of claim 8, wherein determining the power ratio comprises inferring the first power level based on the predetermined demodulation penalty.

12. The method of claim 8, further comprising generating the channel estimate from the reference signal.

13. The method of claim 8, further comprising setting the first power level based on a modulation and coding scheme.

14. The method of claim 8, further comprising:
   providing a set of predefined power levels to the data demodulator; and
   selecting one of the predefined power levels that minimizes the demodulation errors.

15. The method of claim 8, wherein the first power level includes a downboost level.

16. A device comprising:
   a receiver configured to receive, from a base station, (i) a reference signal having a first power level and a data signal having a second power level, and (ii) a signal indicating a magnitude of the first power level;
   a boost determiner configured to determine a power ratio between the first power level and the second power level that minimizes demodulation errors based on the signal and from a predetermined demodulation penalty for a data demodulator, wherein the predetermined demodulation penalty is a function of a sum of the power ratio and a channel estimation processing gain of a channel estimator;
   the channel estimator configured to generate a channel estimate based on the reference signal and the power ratio; and
   the data demodulator configured to demodulate the data signal received from the base station, wherein the data signal is demodulated based on the power ratio and the channel estimate;
   wherein the channel estimation processing gain is a processing gain of the channel estimator with which the reference signal is processed to generate the channel estimate; and
   wherein the predetermined demodulation penalty is an expected demodulation error level when the reference signal having the first power level is processed by the channel estimator having the channel estimation processing gain.

17. The device of claim 16, wherein the first power level is specific to the device.

18. The device of claim 16, wherein the first power level includes a downboost level.

* * * * *